US009022849B2

(12) United States Patent
Montenegro et al.

(10) Patent No.: US 9,022,849 B2
(45) Date of Patent: May 5, 2015

(54) METHOD OF GAMING, A GAMING SYSTEM, AND A GAME CONTROLLER

(75) Inventors: Daniel Julio Montenegro, Endeavour Hills (AU); Boris Mitelman, Elwood (AU); Michael Manto, Surry Hills (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/174,135

(22) Filed: Jun. 30, 2011
(Under 37 CFR 1.47)

(65) Prior Publication Data

US 2012/0122542 A1 May 17, 2012

(30) Foreign Application Priority Data

Jul. 1, 2010 (AU) ................................ 2010902935

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.
CPC ............ *G07F 17/34* (2013.01); *G07F 17/3265* (2013.01)

(58) Field of Classification Search
USPC ...................................................... 463/16, 20
See application file for complete search history.

(56) References Cited

U.S. PATENT DOCUMENTS

| | | | | |
|---|---|---|---|---|
| 4,386,207 | A | 5/1983 | de Graaf et al. | |
| 5,582,350 | A | 12/1996 | Kosmyna et al. | |
| 6,261,177 | B1 | 7/2001 | Bennett | |
| 2003/0073474 | A1 | 4/2003 | Bowman | |
| 2003/0073481 | A1 | 4/2003 | Bennett | |
| 2003/0192689 | A1 | 10/2003 | Moake et al. | |
| 2004/0034240 | A1 | 2/2004 | Borchert et al. | |
| 2005/0143157 | A1 | 6/2005 | Stelzer et al. | |
| 2005/0182281 | A1 | 8/2005 | Hesse et al. | |
| 2006/0084492 | A1 * | 4/2006 | Baerlocher et al. ............. | 463/20 |
| 2006/0258462 | A1 | 11/2006 | Cheng et al. | |
| 2007/0018388 | A1 | 1/2007 | Smith | |
| 2007/0135198 | A1 | 6/2007 | Costello et al. | |
| 2007/0265081 | A1 | 11/2007 | Shimura et al. | |
| 2007/0265082 | A1 | 11/2007 | Shimura et al. | |
| 2008/0039182 | A1 | 2/2008 | Loose et al. | |
| 2008/0051188 | A1 | 2/2008 | Inamura | |
| 2008/0107194 | A1 | 5/2008 | Cho et al. | |
| 2008/0146324 | A1 | 6/2008 | Anderson | |
| 2008/0167125 | A1 | 7/2008 | Dias Pires et al. | |

(Continued)

FOREIGN PATENT DOCUMENTS

| | | | |
|---|---|---|---|
| AU | 2009201800 | A1 | 12/2009 |
| AU | 2009201929 | A1 | 12/2009 |

(Continued)

*Primary Examiner* — Kang Hu
(74) *Attorney, Agent, or Firm* — McAndrews, Held & Malloy, Ltd.

(57) ABSTRACT

There is disclosed a method of gaming. The method comprises selecting a plurality of symbols for display on a display at a plurality of display positions, modifying the displayed symbols by applying a symbol characteristic to at least one of the symbols displayed within a designated area on the display, the designated area encompassing a subset of the plurality of display positions, and determining whether or not to make an award based on the plurality of symbols as modified.

29 Claims, 7 Drawing Sheets

(56) References Cited

U.S. PATENT DOCUMENTS

| | | | |
|---|---|---|---|
| 2008/0224897 | A1 | 9/2008 | Silva |
| 2008/0232510 | A1 | 9/2008 | Golitschek Edler Von Elbwart et al. |
| 2009/0088242 | A1 | 4/2009 | Richardson |
| 2009/0166931 | A1 | 7/2009 | Liu et al. |
| 2009/0215522 | A1 | 8/2009 | Yoshizawa |
| 2009/0239632 | A1 | 9/2009 | Leup et al. |

FOREIGN PATENT DOCUMENTS

| | | | |
|---|---|---|---|
| CN | 2545611 | Y | 4/2003 |
| CN | 1470817 | A | 1/2004 |
| CN | 2625914 | Y | 7/2004 |
| CN | 1602666 | A | 4/2005 |
| CN | 1629780 | A | 6/2005 |
| CN | 2840755 | Y | 11/2006 |
| CN | 1924899 | A | 3/2007 |
| CN | 201031441 | Y | 3/2008 |
| CN | 201047963 | Y | 4/2008 |
| CN | 101192894 | A | 6/2008 |
| CN | 101303742 | A | 11/2008 |
| CN | 101414213 | A | 4/2009 |
| CN | 101547236 | A | 9/2009 |
| DE | 10020223 | A1 | 3/2001 |
| DE | 102007043379 | A1 | 4/2009 |
| DE | 102008007412 | A1 | 8/2009 |
| EP | 1129886 | A2 | 9/2001 |
| FR | 2815137 | A1 | 4/2002 |
| FR | 2860282 | A1 | 4/2005 |
| GB | 2098778 | A | 11/1982 |
| GB | 2328311 | A | 2/1999 |
| GB | 2393918 | A | 4/2001 |
| GB | 2413773 | A | 9/2005 |
| JP | 3266914 | A | 11/1991 |
| JP | 4136324 | A | 5/1992 |
| JP | 5177048 | A | 7/1993 |
| JP | 6225962 | A | 8/1994 |
| JP | 8084795 | A | 4/1996 |
| JP | 8155133 | A | 6/1996 |
| JP | 11044184 | A | 2/1999 |
| JP | 11146961 | A | 6/1999 |
| JP | 2001170354 | A | 6/2001 |
| JP | 2001327750 | A | 11/2001 |
| JP | 2002000852 | A | 1/2002 |
| JP | 2004048716 | A | 2/2004 |
| JP | 2004064587 | A | 2/2004 |
| JP | 2004147965 | A | 5/2004 |
| JP | 2004260862 | A | 9/2004 |
| JP | 2005342012 | A | 12/2005 |
| JP | 2006043127 | A | 2/2006 |
| JP | 2006043133 | A | 2/2006 |
| JP | 2006043134 | A | 2/2006 |
| JP | 2006043137 | A | 2/2006 |
| JP | 2006043139 | A | 2/2006 |
| JP | 2006043143 | A | 2/2006 |
| JP | 2006079615 | A | 3/2006 |
| JP | 2006087909 | A | 4/2006 |
| JP | 2006211134 | A | 8/2006 |
| JP | 2006295332 | A | 10/2006 |
| JP | 2006332878 | A | 12/2006 |
| JP | 2007037641 | A | 2/2007 |
| JP | 2007037748 | A | 2/2007 |
| JP | 2007077799 | A | 3/2007 |
| JP | 2007319355 | A | 12/2007 |
| JP | 2008043653 | A | 2/2008 |
| JP | 2008116766 | A | 5/2008 |
| JP | 2008219671 | A | 9/2008 |
| JP | 2008272216 | A | 11/2008 |
| JP | 2008289714 | A | 12/2008 |
| JP | 2008289792 | A | 12/2008 |
| JP | 2008289793 | A | 12/2008 |
| JP | 2009034403 | A | 2/2009 |
| JP | 2009095045 | A | 4/2009 |
| MX | PA06013306 | A | 2/2007 |
| RU | 2336486 | C2 | 10/2008 |
| WO | 9919747 | A1 | 4/1999 |
| WO | 0007679 | A1 | 2/2000 |
| WO | 0229472 | A1 | 4/2002 |
| WO | 2007046191 | A1 | 4/2007 |
| WO | 2007085981 | A2 | 8/2007 |
| WO | 2007114115 | A1 | 10/2007 |
| WO | 2008019821 | A1 | 2/2008 |
| WO | 2008070824 | A2 | 6/2008 |
| WO | 2008088870 | A1 | 7/2008 |
| WO | 2009002078 | A2 | 12/2008 |
| WO | 2009108026 | A2 | 9/2009 |
| WO | 2009110756 | A1 | 9/2009 |

* cited by examiner

METHOD OF GAMING, A GAMING SYSTEM, AND A GAME CONTROLLER

RELATED APPLICATIONS

This application claims priority to Australian Patent Application No. 2010902935, having a filing date of Jul. 1, 2010, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system, and a game controller.

Spinning-reel type games are available in many gaming venues. At these venues, the game is usually provided by stand alone gaming machines, each having a plurality of reels. To initiate play of a game, a player places a wager and causes all the reels to spin. When the spinning reels stop, they reveal a symbol at each of a plurality of display positions. Depending on whether the displayed symbol forms a winning symbol combination, an award may be provided to the player.

While such gaming systems provide players with enjoyment, a need exists for alternative gaming systems in order to maintain or increase player enjoyment.

BRIEF SUMMARY OF THE INVENTION

In a first aspect, the invention provides an electronic method of gaming comprising:

selecting a plurality of symbols for display on a display at a plurality of display positions;

modifying the displayed symbols by applying a symbol characteristic to at least one of the symbols displayed within a designated area on the display, the designated area encompassing a subset of the plurality of display positions; and determining whether to make an award based on the plurality of symbols as modified.

In an embodiment, the method further comprises determining whether a modification condition is met and modifying the displayed symbols upon the modification condition being met.

In an embodiment, the modification condition is that a designated symbol is selected for display at one of the display positions of the designated area.

In an embodiment, the designated symbol is a WILD symbol.

In an embodiment, the symbol characteristic is at least one function.

In an embodiment, the at least one function comprises a substitute function.

In an embodiment, the at least one function comprises a multiplier function.

In an embodiment, the symbol characteristic is the appearance of a WILD symbol.

In an embodiment, the symbol characteristic is applied to all of the symbols selected for display in the designated area.

In an embodiment, the designated area comprises a cluster of adjacent display positions.

In an embodiment, the method further comprises selecting a position for the designated area.

In an embodiment, the method further comprises determining whether to make an award based on the plurality of selected symbols prior to modifying the displayed symbols.

In a second aspect, the invention provides a gaming system comprising:

a display;

a symbol selector arranged to select a plurality of symbols for display on the display at a plurality of display positions;

a symbol modifier arranged to modify the displayed symbols by applying a symbol characteristic to at least one of the symbols displayed within a designated area on the display, the designated area encompassing a subset of the plurality of display positions; and an award determiner arranged to determine whether to make an award based on the plurality of symbols as modified.

In an embodiment, the symbol modifier comprises a modification condition determiner arranged to determine whether a modification condition is met and the symbol modifier is arranged to modify the displayed symbols upon the modification condition being met.

In an embodiment, the modification condition is that a designated symbol is selected for display at one of the display positions of the designated area.

In an embodiment, the designated symbol is a WILD symbol.

In an embodiment, the symbol characteristic is at least one function.

In an embodiment, the at least one function comprises a substitute function.

In an embodiment, the at least one function comprises a multiplier function.

In an embodiment, the symbol characteristic is the appearance of a WILD symbol.

In an embodiment, the symbol modifier is arranged to modify the displayed symbols by applying the symbol characteristic to all the symbols selected for display in the designated area.

In an embodiment, the designated area comprises a cluster of adjacent display positions.

In an embodiment, the method further comprises a designated area selector arranged to select a position for the designated area.

In an embodiment, the award determiner is arranged to determine whether to make an award based on the plurality of selected symbols prior to modifying the displayed symbols.

In a third aspect, the invention provides a game controller for a gaming system, the game controller arranged to:

select a plurality of symbols for display on a display at a plurality of display positions;

modify the displayed symbols by applying a symbol characteristic to at least one of the symbols displayed within a designated area on the display, the designated area encompassing a subset of the plurality of display positions; and determine whether to make an award based on the plurality of symbols as modified.

In an embodiment, the game controller is arranged to determine whether a modification condition is met and modifying the displayed symbols upon the modification condition being met.

In an embodiment, the modification condition is that a designated symbol is selected for display at one of the display positions of the designated area.

In an embodiment, the designated symbol is a WILD symbol.

In an embodiment, the symbol characteristic is at least one function.

In an embodiment, the at least one function comprises a substitute function.

In an embodiment, the at least one function comprises a multiplier function.

In an embodiment, the symbol characteristic is the appearance of a WILD symbol.

In an embodiment, the symbol characteristic is applied to all of the symbols selected for display in the designated area.

In an embodiment, the designated area comprises a cluster of adjacent display positions.

In an embodiment, the game controller is arranged to select a position for the designated area.

In an embodiment, the game controller is arranged to determine whether to make an award based on the plurality of selected symbols prior to modifying the displayed symbols.

In a fourth aspect, the invention provides a gaming machine comprising:

a display; and a game controller comprising:

a symbol selector arranged to select a plurality of symbols for display on the display at a plurality of display positions;

a symbol modifier arranged to modify the displayed symbols by applying a symbol characteristic to at least one of the symbols displayed within a designated area on the display, the designated area encompassing a subset of the plurality of display positions; and an award determiner arranged to determine whether to make an award based on the plurality of symbols as modified.

In a fifth aspect, the invention provides computer program code which when executed implements the above method.

In a sixth aspect, the invention provides a tangible computer readable medium comprising the above program code.

In a seventh aspect, the invention provides a data signal comprising the above program code.

In an eighth aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
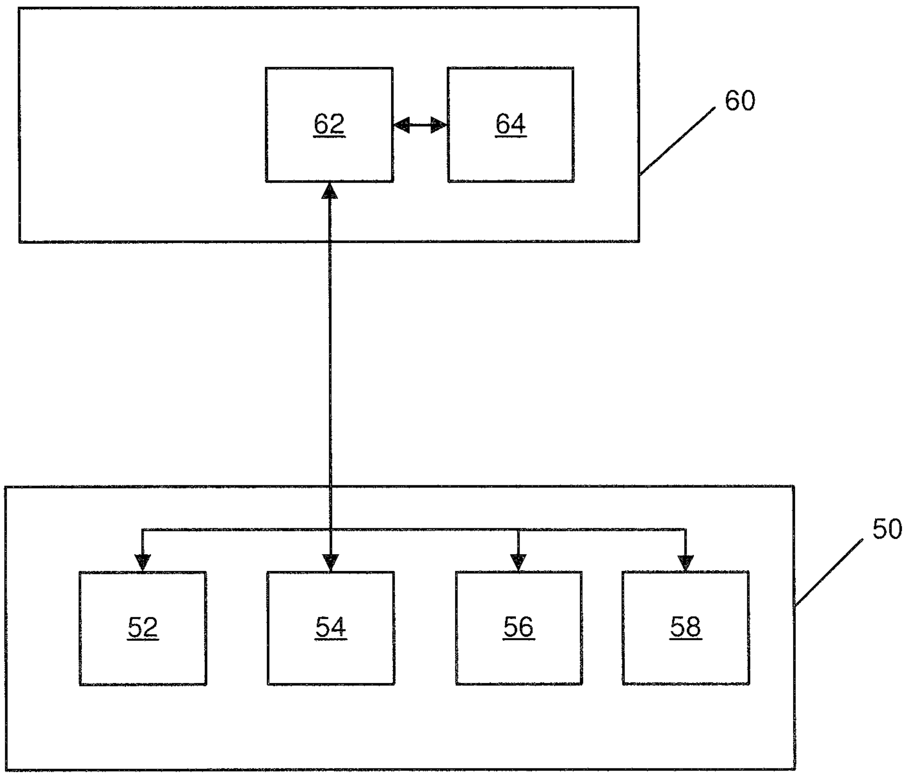
FIG. 1 is a block diagram of the core components of a gaming system.

Referring to the drawings, there is shown a gaming system arranged to implement a game wherein a plurality of symbols are selected and displayed at a plurality of display positions on a display. An area on the display encompassing a subset of the plurality of display positions is designated. During game play, the displayed symbols may be modified by applying a symbol characteristic to at least one of the symbols displayed within the designated area.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
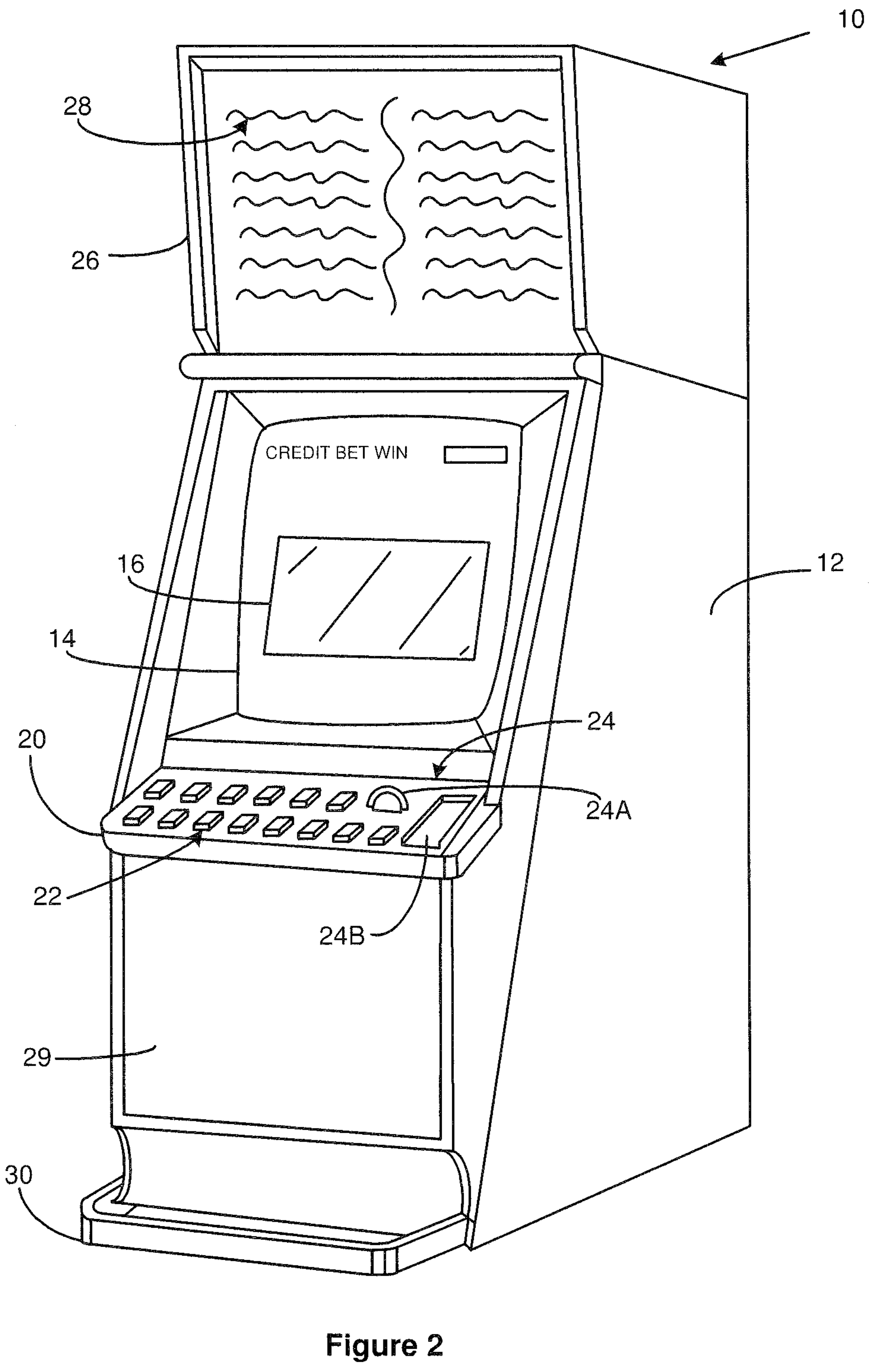
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
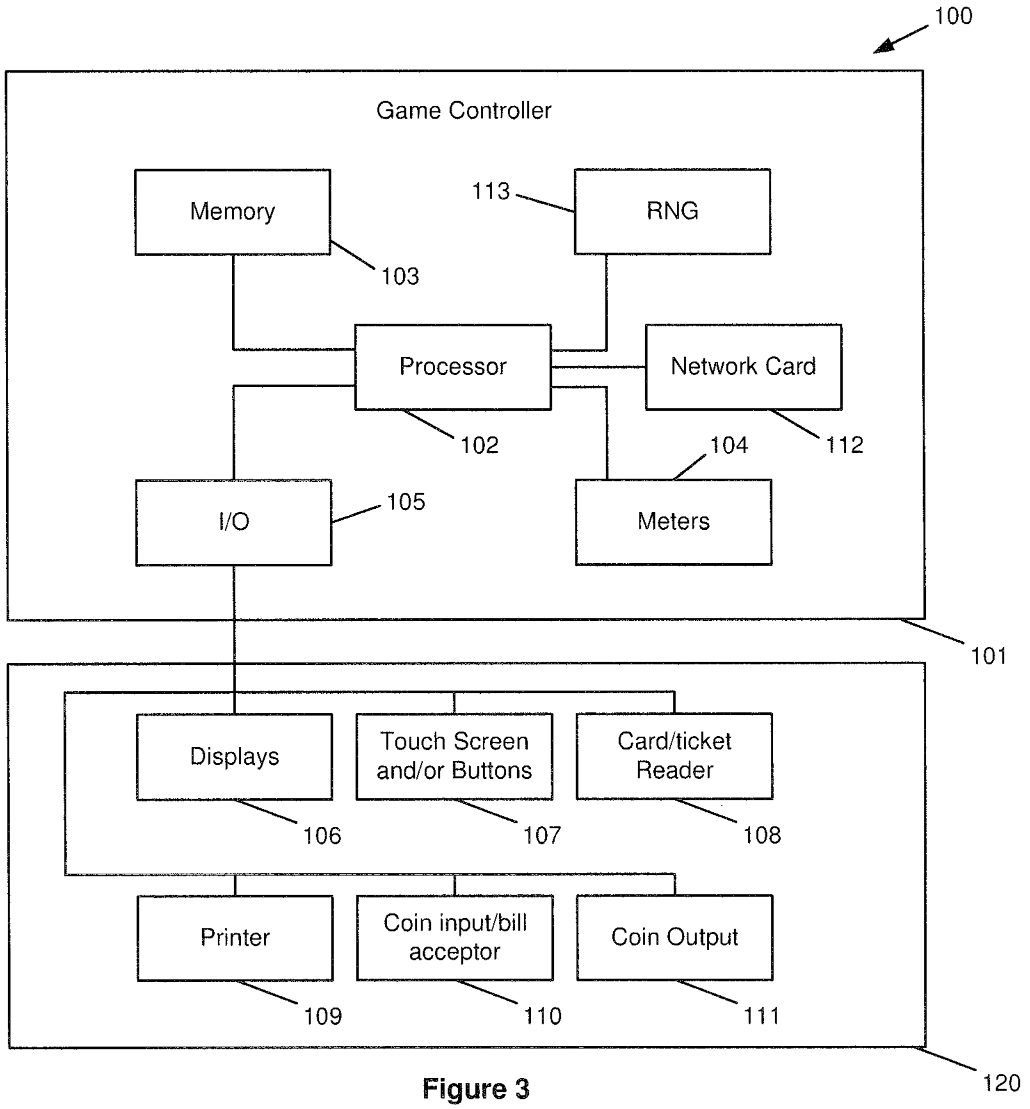
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
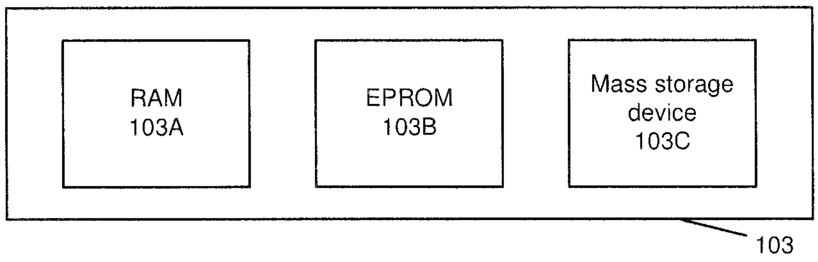
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
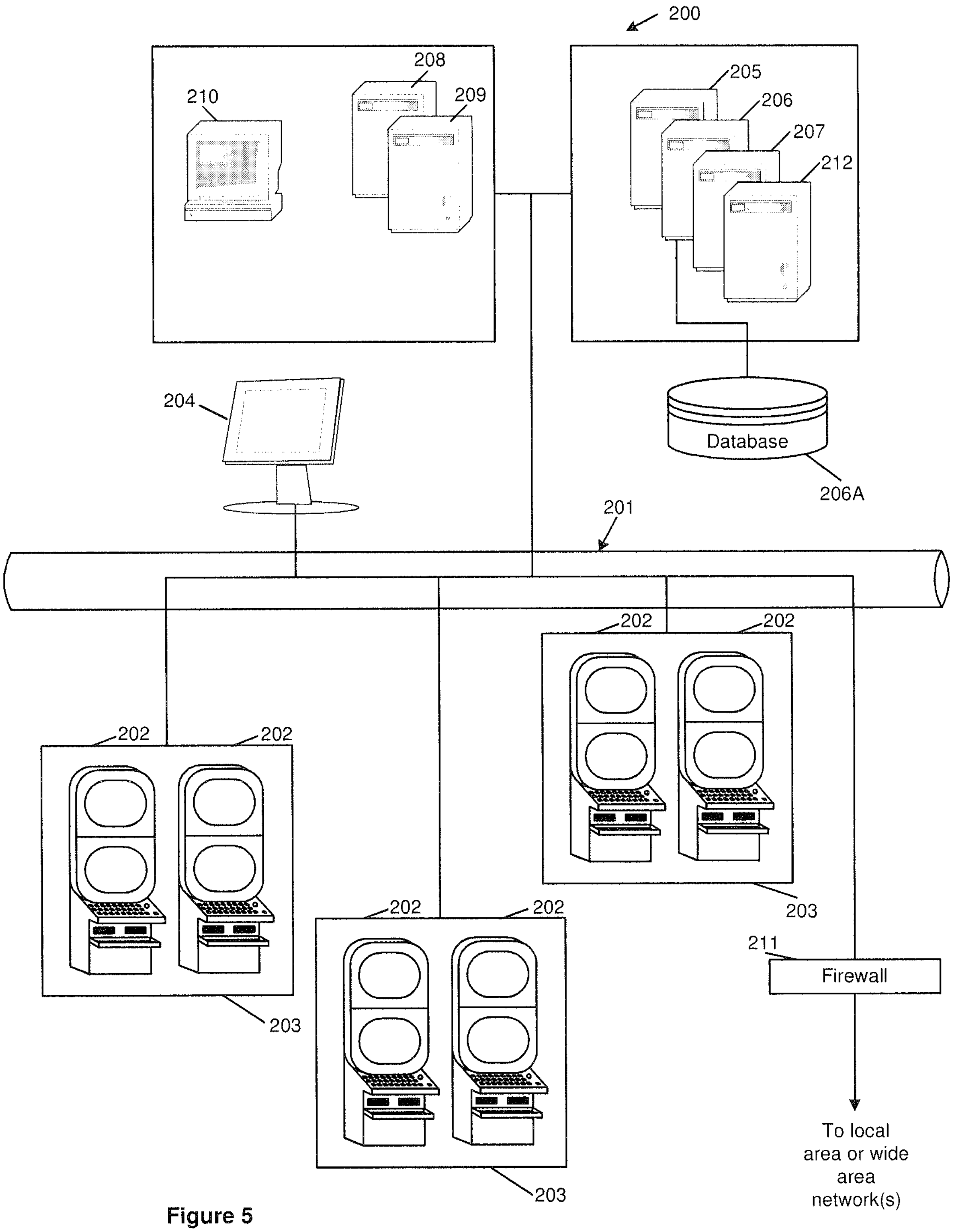
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
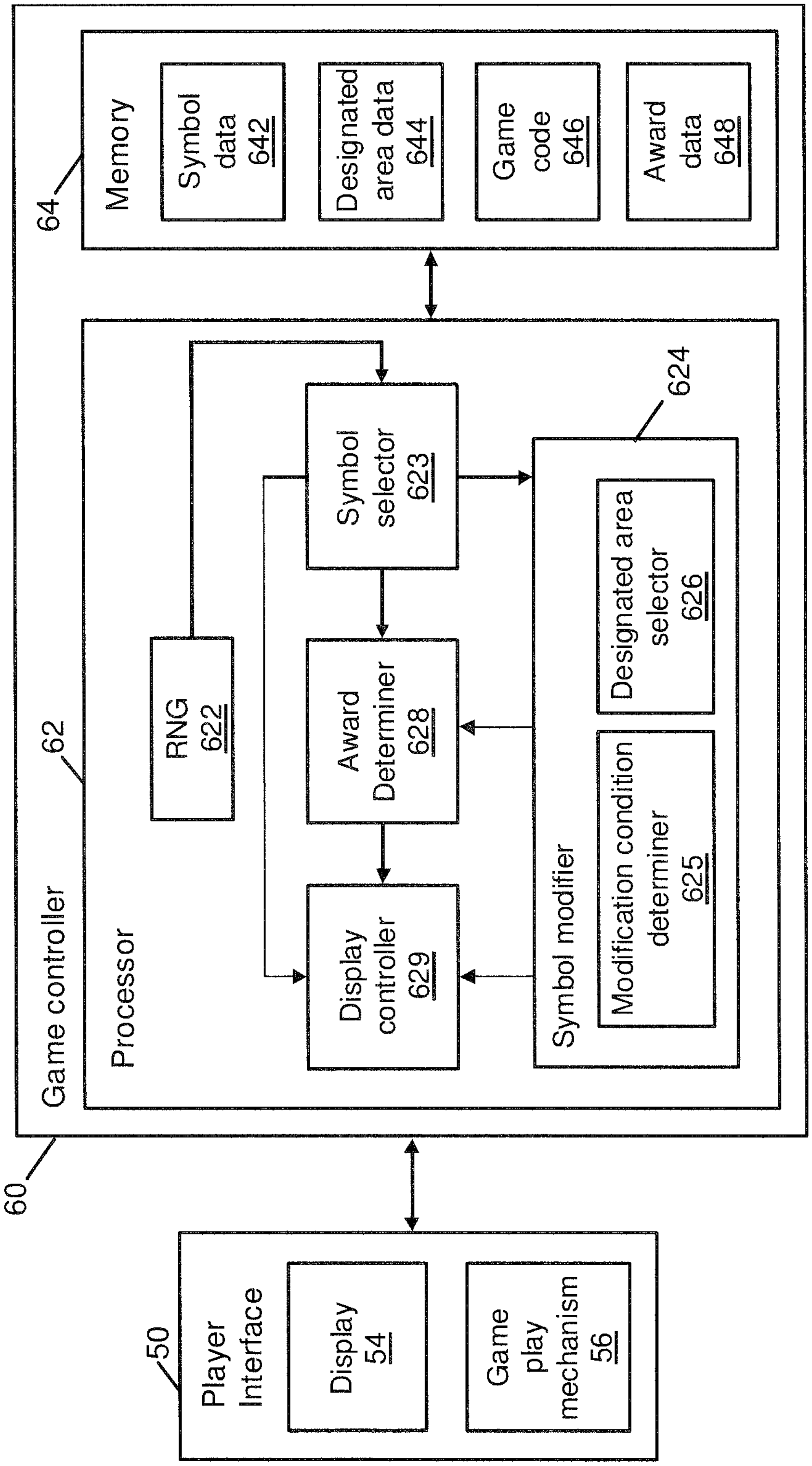
FIG. 6 is a further block diagram of a gaming system.

FIG. 6 shows the functional components of an embodiment of the gaming system having a game controller 60 comprising a processor 62 arranged to implement a number of modules based on game code 646 and data stored in memory 64. Persons skilled in the art will appreciate that the modules are typically implemented using a processor based on code and data stored in memory but that one or more of the modules could alternatively be implemented in some other way, for example by a dedicated circuit.

In the embodiment, the game is a spinning-reel type game comprising a number of columns of display positions. Persons skilled in the art will appreciate that a spinning-reel type game may vary in terms of the number of columns or the number of display positions per column. For example, the game may be a 4×6 spinning-reel type game having four columns, each column being made up of six vertically adjacent display positions; a 5×3 spinning-reel type game having five columns, each column being made up of three vertically adjacent display positions etc.

The modules implemented by the processor 62 include a symbol selector 623, a symbol modifier 624 and an award determiner 628.

The symbol selector 623 is arranged to select a symbol for display on the display 54 at each of the plurality of display positions. In the embodiment, memory 64 includes symbol data 642 which specifies a sequence of symbols for each reel and during a game, the symbol selector 623 selects all of the symbols for a column of display positions by selecting a stopping position in the sequence. In the embodiment, the stopping position is determined based on a pseudo-random number generated by a Random Number Generator (RNG) 622. It is envisaged that symbols may be selected in some other way. For example, each symbol may be selected individually based on a pseudo-random number generated by a RNG.

In the embodiment, the symbol modifier 624 is arranged to modify the displayed symbols by applying a symbol characteristic to all of the symbols displayed within a designated area encompassing a subset of the plurality of display positions on the display 54 upon a modification condition being met. Depending on the embodiment, the symbol modifier 624 may not modify all the symbols selected for display in the designated area and may modify only one or some of the symbols. For example, in an embodiment, the symbol modifier 624 may modify only certain types of symbols selected for display in the designated area. It is envisaged that the designated area can encompass any cluster of adjacent display positions on the display. For example, on a 4×6 spinning-reel type game having twenty four display positions, a designated area can be the cluster formed from the four center display positions.

In the embodiment, the symbol characteristic is a substitute function, and as part of applying this function, the appearance of the symbol is changed to a WILD symbol. Accordingly, upon the application of the symbol characteristic, all the symbols of the designated area become WILD substitute symbols in the embodiment. It is envisaged that the symbol characteristic can be any one or more characteristics associated with one or more symbols. For example, the symbol characteristic can be just a function (such as just a substitute function or just a multiplier function), two or more functions, just the appearance of a symbol (e.g. such that the symbol changes appearance) etc.

In the embodiment, the symbol modifier 624 comprises a modification condition determiner 625 and a designated area selector 626. The modification condition determiner 625 is arranged to determine whether a modification condition is met and the symbol modifier 624 is arranged to modify the displayed symbols upon the modification condition being met. It is envisaged that in other embodiments, the gaming system may not comprise a modification condition determiner 625 (for example, in an embodiment where the symbol modifier 624 is configured always to modify the display symbols). In the embodiment, the modification condition is that a WILD symbol is selected for display at least one of the display positions of the designated area. Persons skilled in the art will appreciate that a modification condition may be any selection criteria, for example, the modification condition can alternatively or additionally be whether a player has made an ante bet.

The designated area selector 626 is arranged to select a designated area encompassing a subset of the plurality of the display positions on the display 54 based on designated area data. Depending on the implementation, the selection can be random (for example, the designated area selector 626 may randomly select a set of display positions from the designated area data 644 based on pseudo-random numbers from the RNG 622) or predetermined (for example, based on a predetermined sequence stored in the designated area data 644). Persons skilled in the art will appreciate that the designated area may be selected in a variety of ways, for example, it may be based on the amount the player has placed on the current bet. In the embodiment, the display positions of the designated area can vary from game to game. Persons skilled in the art will however appreciate that the display positions of the designated area can be fixed (for example, in an embodiment where the symbol modifier does not include a designated area selector), vary from game to game, and can be based on whether certain criteria are satisfied (for example, they can depend on the amount the player wagers in a game). Persons skilled in the art will also appreciate that there may be more than one designated area and that each of these designated area may apply a different symbol characteristic to one or more of the symbols displayed within the area.

The award determiner 628 is arranged to determine whether to make an award based on the plurality of symbols as modified and on the symbols prior to symbol modification. It is envisaged that in another embodiment, the award determiner 628 may only determine whether to make an award based on the plurality of symbols as modified. In the embodiment, the award determiner 628 makes an award if the symbols include a winning combination. Persons skilled in the art will appreciate that winning combinations can be provided in many ways, for example, by award data 648 which stores possible winning combination as a pay table. It is envisaged that depending on the number and type of each winning combination included in the displayed symbols, the award determiner 628 can make one or more than one award. Examples of awards that may be stored in award data 648 include monetary prizes, credits, feature games etc. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

The modules implemented by the processor 62 also include a display controller 629 arranged to communicate with the player interface 50 to control the display 54 of the player interface 50 to display to the game to the player. During a game, the display controller 629 may control the display 54 to display the symbols selected for each of the display positions by the symbol selector 623, to highlight to a player the placement of the designated area, to display the symbol or symbols within the designated area being modified by the symbol modifier 624 (for example, display positions may be displayed as flipping from one symbol to another symbol) etc.

Depending on the embodiment, the spinning-reel type game can be a line-based game or a reel-based game. In a line-based game, a player's win entitlement is based on how many win lines the player plays in each game (for example, a minimum of one win line up to the maximum number of win lines allowed by the game) and how much they wager per line. Such win lines are typically formed by a combination of symbol display positions, one from each reel, the symbol display positions being located relative to one another such that they form a line. Persons skilled in the art will appreciate that in some line-based games, the player's win entitlement may not be strictly limited to the lines they have selected, for example, "scatter" pays can be awarded independently of a player's selection of pay lines and can be an inherent part of a win entitlement. In such games, a winning combination must fall on a win line selected by the player (or otherwise be part of the win entitlement) for the player to be awarded the corresponding award.

In a reel-based game, a player obtains a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. Thus, for a 5×3 spinning-reel type game having five reels and fifteen display positions, there can be 243 ways to win, such that a player wins an award if a winning combination is covered by any one of these ways to win.

Figure 7:
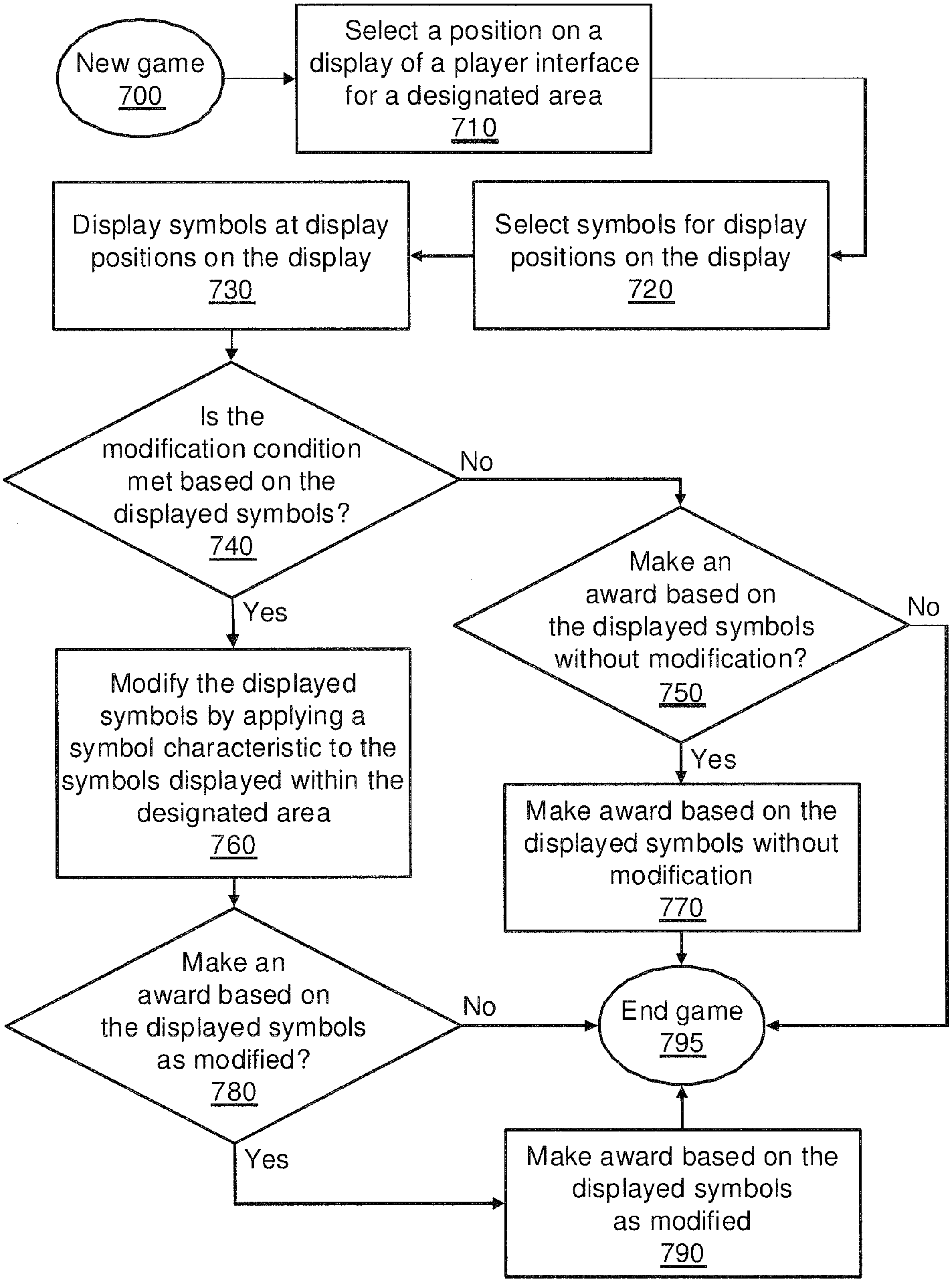
FIG. 7 is a flow chart of an embodiment.

FIG. 7 is a flowchart illustrating an embodiment of the method of gaming. At step 700, a new spinning-reel type game wherein a plurality of symbols is selected and displayed on the display 54 is initiated by a player using the game play mechanism 56. At step 710, the position and size of the designated area is selected by the designated area selector 626 based on the designated area data 644. The display controller 629 then controls the display 54 to highlight the designated area. At step 720, a plurality of symbols is selected by the symbol selector 623 for display at a plurality of display positions. The display controller 629 then controls the display 54 to display the selected symbols 730 on the display 54.

At step 740, the modification condition determiner 625 determines whether a modification condition is met based on the displayed symbols. In the embodiment, the modification condition is that a WILD symbol is selected for display at one or more of the display positions of the designated area.

If the modification condition is not met, the gaming system determines whether to make an award based on the symbols selected by the symbol selector 623 for display on the display 54 (that is, based on unmodified symbols) 750. In the embodiment, this determination depends on whether the symbols include a winning combination. An award is made based on the displayed symbols without modification (that is, the unmodified symbols) if the symbols include a winning combination 770. Otherwise, the game ends 795.

If the modification condition is met, the symbol modifier 624 modifies the displayed symbols by applying a symbol characteristic to the symbols displayed within the designated area 760. In the embodiment, the symbol characteristic is a substitute function and the appearance of a WILD symbol. In the embodiment, the symbol characteristic is applied to all the symbols displayed within the designated area. Accordingly, if the modification condition is met, the symbol modifier 624 modifies the displayed symbols by modifying all the symbols displayed within the designated area 760 on the display 54 to become WILD substitute symbols.

After the symbols are modified, the award determiner determines whether to make an award based on the symbols displayed at the plurality of display positions as modified on the display 54. An award is made based on the displayed symbols as modified if the symbols include a winning combination 770. Otherwise, the game ends 795.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

EXAMPLE

Figure 8A:
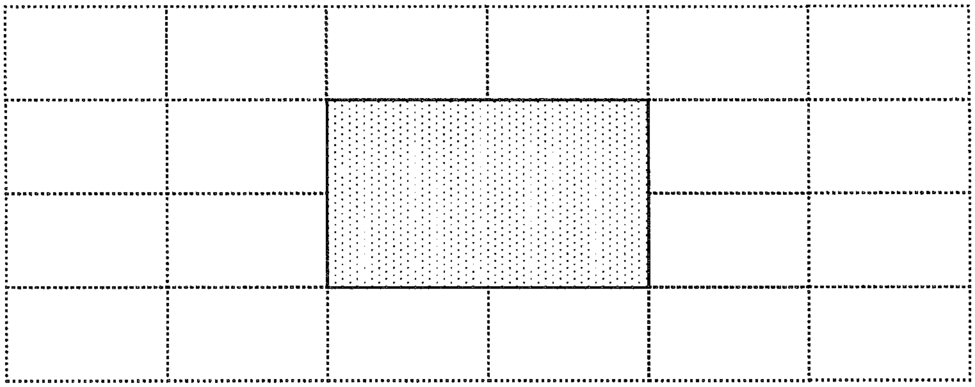
FIGS. 8A, 8B and 8C are diagrammatic representations of an example of a game.
Figure 8B:
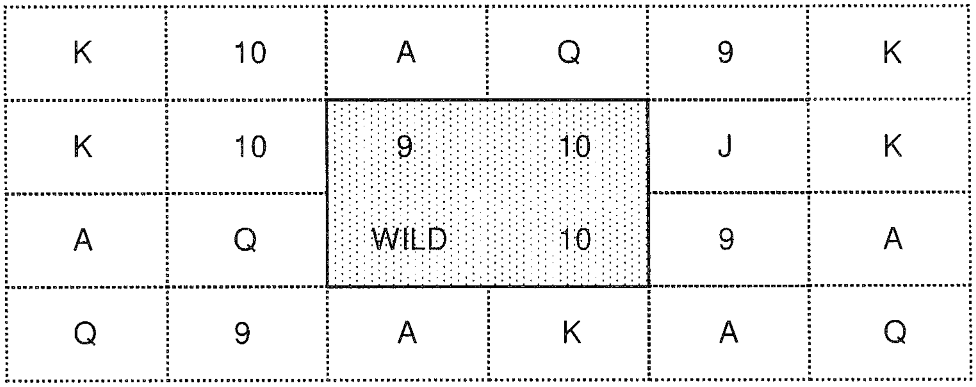
Figure 8C:
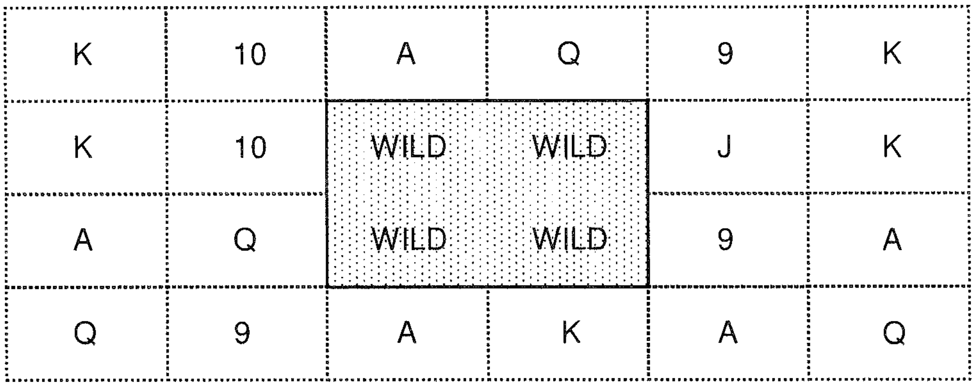

FIGS. 8A to 8C illustrate an example of how in a spinning-reel type game implemented by the gaming system, a symbol characteristic is applied to the symbols displayed in the display positions of the designated area of the display 54. In the example, the spinning-reel type game is a 4×6 spinning-reel type game.

FIG. 8A illustrates the twenty four display positions of the game displayed on the display 54. As illustrated, the game includes a designated area encompassing a cluster of four display positions positioned in the centre of the twenty four display positions of the game. In the example, the designated area is selected by the designated area selector 626 from a plurality of designated area positions and sizes stored in the designated area data 644.

FIG. 8B illustrates the display 54 after a plurality of symbols are selected by the symbol selector 623 and displayed on the display 54 at the twenty four display positions. In the example, the symbols are selected from the symbol data 642 based on pseudo-random numbers generated by the RNG 622.

In the gaming system, the symbol modifier 624 is arranged to modify the displayed symbols upon a modification condition being met, and the modification condition is that a WILD symbol is selected at least one of the display positions of the designated area. As illustrated in FIG. 8B, one of the symbols selected for display in the designated area is a WILD symbol.

Thus, in the example, the modification condition determiner 625 determines that a WILD symbol is selected at least one of the display positions of the designated area and that the modification condition is met. Accordingly, the symbol modifier 624 modifies the display symbols in the example so that all the symbols of the designated area become WILD substitute symbols.

FIG. 8C illustrates the symbols displayed at the plurality of display positions as modified. As illustrated, all the symbols of the designated area are now WILD substitute symbols. The award determiner 628 determines whether to make an award based on the symbol displayed at the display positions as modified. In the example, the displayed symbols include a winning combination of four Aces displayed in the third column of display positions and accordingly, an award is made to the player.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of gaming for use with a gaming system having a game controller, a designated area selector, and a display, the method comprising:

selecting via the game controller a plurality of symbols for display on the display at a plurality of display positions;

randomly designating using said designated area selector a subset of the display positions as a designated area, said randomly designating comprising selecting with said designated area selector at least a size of the designated area;

determining if any of the displayed symbols within the randomly designated area has a designated symbol having a symbol characteristic;

determining, in response to a displayed symbol within the randomly designated area having a symbol characteristic, if the remaining of the displayed symbols within the randomly designated area is a predetermined type of symbols;

modifying via the game controller one of said remaining symbols within the randomly designated area in response to said one remaining symbol being said predetermined type of symbols by applying said symbol characteristic to said one remaining symbol displayed within the randomly designated area on the display; and determining whether to make an award based on the plurality of symbols as modified.

2. An electronic method as claimed in claim 1, wherein the designated symbol is a WILD symbol.

3. An electronic method as claimed in claim 1, wherein the symbol characteristic is at least one function.

4. An electronic method as claimed in claim 3, wherein the at least one function comprises a substitute function.

5. An electronic method as claimed in claim 3, wherein the at least one function comprises a multiplier function.

6. An electronic method as claimed in claim 1, wherein the symbol characteristic is the appearance of a WILD symbol.

7. An electronic method as claimed in claim 1, wherein the designated area comprises a cluster of adjacent display positions.

8. An electronic method as claimed in claim 1, and wherein said randomly designating includes randomly changing the designated area from game to game.

9. An electronic method as claimed in claim 1, further comprising determining whether to make an award based on the plurality of selected symbols prior to modifying the displayed symbols.

10. A gaming system comprising:

a display having a plurality of display positions;

a symbol selector configured to select a plurality of symbols for display on the display at the display positions;

a designated area selector configured to randomly designate a subset of the display positions as a designated area so as to select at least a size of the designated area;

a symbol modifier configured to 1) determine if any of the displayed symbols within the randomly designated area has a designated symbol having a symbol characteristic, 2) determining, in response to a displayed symbol within the randomly designated area having a symbol characteristic, if the remaining of the displayed symbols within the randomly designated area is a predetermined type of symbols, and 3) modify one of said remaining symbols within the randomly designated area in response to said one remaining symbol being said predetermined type of symbols by applying said symbol characteristic to said one remaining symbol displayed within the randomly designated area on the display; and an award determiner configured to determine whether to make an award based on the plurality of symbols as modified.

11. A gaming system as claimed in claim 10, wherein the designated symbol is a WILD symbol.

12. A gaming system as claimed in claim 10, wherein the symbol characteristic is at least one function.

13. A gaming system as claimed in claim 12, wherein the at least one function comprises a substitute function.

14. A gaming system as claimed in claim 12, wherein the at least one function comprises a multiplier function.

15. A gaming system as claimed in claim 10, wherein the symbol characteristic is the appearance of a WILD symbol.

16. A gaming system as claimed in claim 10, wherein the designated area comprises a cluster of adjacent display positions.

17. A gaming system as claimed in claim 10, wherein the designated area selector is further configured to randomly change the designated area from game to game.

18. A gaming system as claimed in claim 10, wherein the award determiner is further configured to determine whether to make an award based on the plurality of selected symbols prior to modifying the displayed symbols.

19. A game controller for a gaming system having a display, the game controller configured to:

select a plurality of symbols for display on a display at a plurality of display positions;

randomly designate a subset of the display positions as a designated area so as to select at least a size of the designated area;

determine if any of the displayed symbols within the randomly designated area has a designated symbol having a symbol characteristic;

determine, in response to a displayed symbol within the randomly designated area having a symbol characteristic, if the remaining of the displayed symbols within the randomly designated area is a predetermined type of symbols;

modify one of said remaining symbols within the randomly designated area in response to said one remaining symbol being said predetermined type of symbols by applying said symbol characteristic to said one remaining symbol displayed within the randomly designated area on the display; and determine whether to make an award based on the plurality of symbols as modified.

20. A game controller as claimed in claim 19, wherein the designated symbol is a WILD symbol.

21. A game controller as claimed in claim 19, wherein the symbol characteristic is at least one function.

22. A game controller as claimed in claim 21, wherein the at least one function comprises a substitute function.

23. A game controller as claimed in claim 21, wherein the at least one function comprises a multiplier function.

24. A game controller as claimed in claim 19, wherein the symbol characteristic is the appearance of a WILD symbol.

25. A game controller as claimed in claim 19, wherein the designated area comprises a cluster of adjacent display positions.

26. A game controller as claimed in claim 19, wherein the game controller is further configured to randomly change the designated area from game to game.

27. A game controller as claimed in claim 19, wherein the game controller is configured to determine whether to make an award based on the plurality of selected symbols prior to modifying the displayed symbols.

28. A gaming machine comprising:

a display having a plurality of display positions; and a game controller comprising:

a symbol selector configured to select a plurality of symbols for display on the display at the display positions;

a designated area selector configured to randomly designate a subset of the display positions as a designated area so as to select at least a size of the designated area;

a symbol modifier configured to 1) determine if any of the displayed symbols within the randomly designated area has a designated symbol having a symbol characteristic, 2) determining, in response to a displayed symbol within the randomly designated area having a symbol characteristic, if the remaining of the displayed symbols within the randomly designated area is a predetermined type of symbols, and 3) modify one of said remaining symbols within the randomly designated area in response to said one remaining symbol being said predetermined type of symbols by applying said symbol characteristic to said one remaining symbol displayed within the randomly designated area on the display; and an award determiner configured to determine whether to make an award based on the plurality of symbols as modified.

29. A gaming machine as claimed in claim 28 wherein the designated area selector is further configured to randomly change the designated area from game to game.

* * * * *